United States Patent [19]
Boer

[11] Patent Number: 4,941,529
[45] Date of Patent: Jul. 17, 1990

[54] PROCESSING APPARATUS FOR VISCOUS MATERIALS

[75] Inventor: Jort Boer, Vorden, Netherlands

[73] Assignee: N.V. Machinefabriek Terlet, Zutphen, Netherlands

[21] Appl. No.: 230,419

[22] Filed: Aug. 10, 1988

[30] Foreign Application Priority Data

Aug. 13, 1987 [NL] Netherlands .......................... 8701906

[51] Int. Cl.⁵ .............................................. F28F 17/00
[52] U.S. Cl. ............................................ 165/94; 62/354
[58] Field of Search ............................... 165/94; 62/354

[56] References Cited

U.S. PATENT DOCUMENTS

| | | |
|---|---|---|
| 2,138,402 | 11/1938 | Getchell . |
| 3,354,136 | 11/1967 | Crawford .......................... 165/94 X |
| 3,476,522 | 11/1969 | Stovall ............................... 165/94 X |
| 3,681,308 | 8/1972 | Irvin .................................. 165/94 X |
| 3,934,952 | 1/1976 | Gardner . |

FOREIGN PATENT DOCUMENTS 7314483  6/1974  Netherlands .

Primary Examiner—Alan Cohan
Attorney, Agent, or Firm—Fleit, Jacobson, Cohn, Price, Holman & Stern

[57] ABSTRACT

A processing apparatus for viscous materials comprises a vertically disposed annular space. The materials to be processed are fed in at the bottom of the annular space and the processed materials are removed at the top. A vertically disposed rotating shaft and a multiplicity of essentially radial arms which are attached to the shaft and to the ends of which vertical components are attached. The vertical components travel around in the annular space as the shaft rotates, so that the inlet of the materials to be processed debouches tangentially into an annular chamber beneath the annular space. The width of the annular chamber is greater than the width of the inlet and is greater that the width of the annular space.

2 Claims, 2 Drawing Sheets

PROCESSING APPARATUS FOR VISCOUS MATERIALS

This invention relates to a processing apparatus for viscous materials, comprising a vertically disposed annular space, the concentric circular cylindrical walls of which may optionally be cooled and/or heated, the materials to be processed being fed in at the bottom of the annular space and the processed materials being removed at the top. A vertically disposed rotating shaft at the centre line of the circular cylindrical walls is mounted at the top in a wall and is sealed with respect thereto. The wall seals off the top of the innermost circular cylindrical wall, and a multiplicity of essentially radial arms which are attached to the shaft above the wall and to the ends of which vertical components are attached which travel around in the annular space as the shaft rotates.

Such a processing apparatus, in the form of a scraping heat exchanger, is known from Dutch Patent Application 7809531 filed by the Applicant.

The processing apparatus can be used for all kinds of purposes, such as, for example, the preparation of products in which whole fruits are present.

When the apparatus is used for such a purpose, break up of the fruits has to be avoided to as great an extent as possible.

The object of the invention is to supply the product in such a way that damage of the fruits is avoided. This is achieved in that the inlet of the materials to be processed debouches tangentially into an annular chamber beneath the annular space, the width of which is greater than the width of the inlet and is greater than the width of the annular space.

Preferably, the width of the annular chamber is about 1.5 to 2.5 times the width of the inlet and of the annular space.

Since the inlet debouches tangentially into the wider annular chamber, the materials to be processed are first able to gather speed before moving upward through the narrower annular space in which the vertical components rotate.

When the materials to be processed arrive between the rotating vertical components, the speeds are substantially the same. No collision with the vertical components takes place and damage to the product, such as fruit, is thus avoided.

DESCRIPTION OF THE PREFERRED EMBODIMENT

Figure 1:
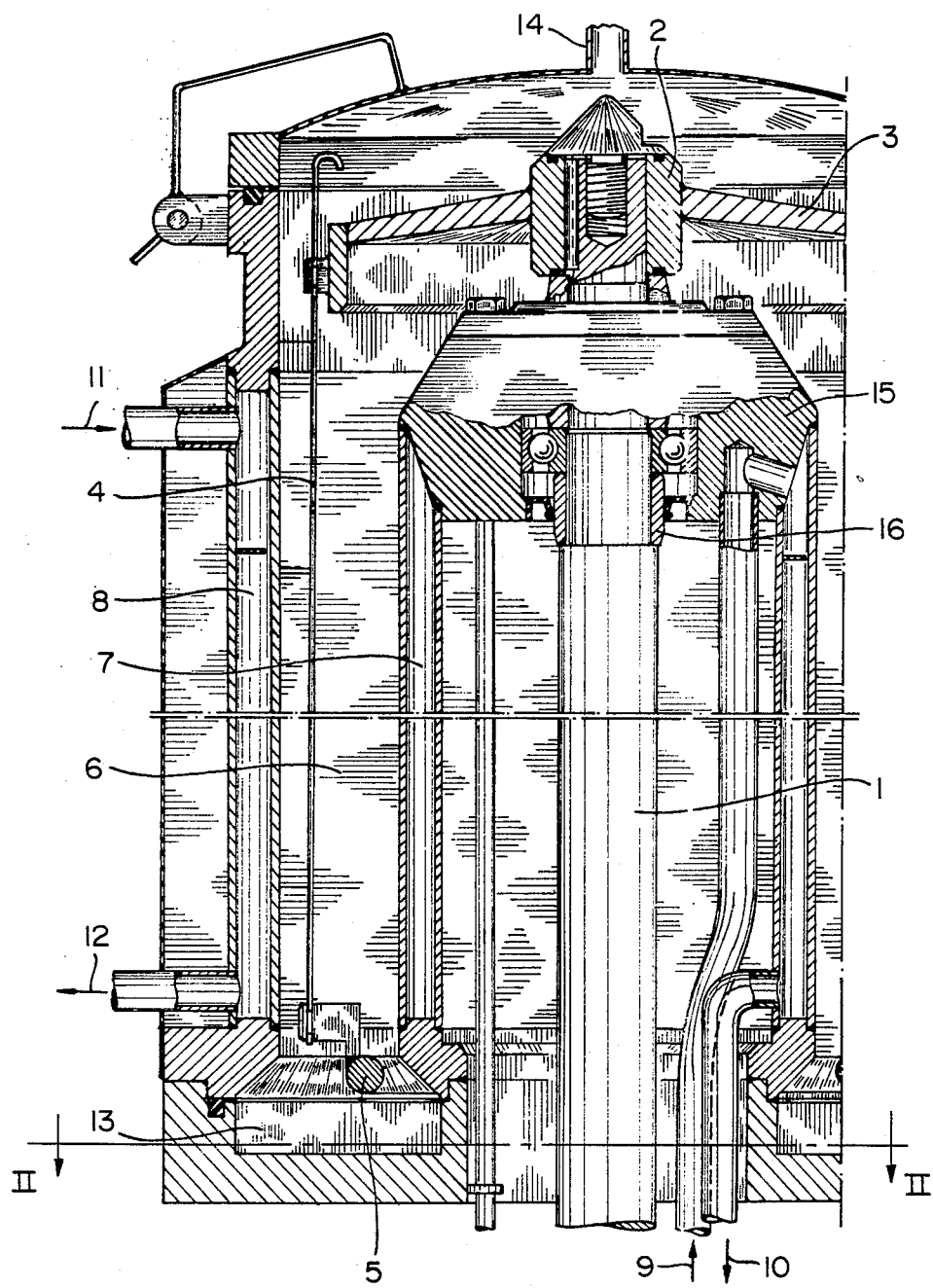
FIG. 1 is a side view, partly in section, of the processing apparatus.
Figure 2:
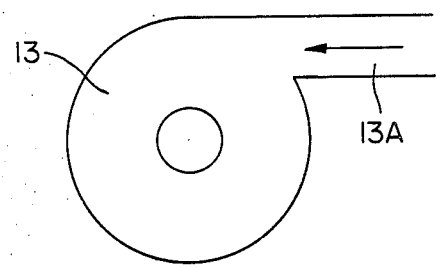
FIG. 2 is a schematical sectional view, as seen along section line II—II of FIG. 1, with the parts extending through the central part of the apparatus omitted, and being on a smaller scale than FIG. 1.

The processing apparatus according to the invention comprises in a known manner a vertically driven shaft 1 which is attached at the top to a head 2 to which a multiplicity, for example four, of arms 3, extending essentially radially, are attached.

The shaft 1 is also mounted at its top in a wall 15 and is sealed with respect thereto by means of seals 16.

Attached to the ends of said arms 3 are vertical stirring and scraping components 4 which are linked at the bottom to a ring 5 which rotates at the same time.

The vertical stirring and scraping components 4 move in a circular cylindrical space 6 which is bounded by a circular cylindrical inner wall 7 and a circular cylindrical outer wall 8.

The inner and outer walls 7 and 8 respectively are each constructed in a known manner in a double-walled configuration. The wall 15 seals off the top of the innermost circular cylindrical wall 7.

Connected to the inner wall 7 are pipes 9 and 10 and connected to the outer wall 8 are pipes 11 and 12 for cooling and/or heating of said walls with the aid of a cooling and/or heating medium.

The materials to be processed, for example fruit in a liquid, are fed in at the bottom of the apparatus, for which purpose an inlet pipe 13A connects tangentially to an annular chamber 13 beneath the space 6. The chamber 13 has a greater width than the space 6, as will be explained below.

The materials to be processed are removed at the upper side in a conventional and usual way through, for example, an outlet 14.

As a result of the presence of wide annular chamber 13 to which the narrower inlet 13A for the materials to be treated, for example fruits in liquid, is tangentially connected, the fruits have the opportunity to gather speed before they are guided upwards into the narrow annular space 6, in which the scraper components are rotating.

As a result of this, damage to the fruit is avoided as far as possible.

With the same object, the stirring and scrapping components 4 are of as flat construction as possible.

I claim:

1. A processing apparatus for viscous materials; comprising:
    innermost and outermost concentric circular cylindrical walls bounding a vertically disposed annular space, said annular space having a radial width, viscous materials to be processed being fed in at the bottom of the annular space and processed viscous materials being removed at the top of the annular space,
    a vertically disposed rotating shaft at the centre line of the circular cylindrical walls, said rotating shaft having a top and a bottom, the top of said rotating shaft being mounted in a wall and sealed with respect thereto, said wall in which the top of the rotating shaft is mounted sealing off the top of the innermost circular cylindrical wall,
    a multiplicity of essentially radial arms which are attached to the shaft above the wall in which the top of the rotating shaft is mounted, and
    vertical components attached to ends of said radial arms, said vertical components traveling around in the annular space as the shaft rotates, an inlet through which the materials to be processed are fed in debouching tangentially into an annular chamber beneath the annular space, said inlet having a width extending in a radial direction of the annular chamber, said annular chamber having a radial width which is greater than the width of the inlet and greater than the radial width of the annular space.

2. Processing apparatus according to claim 1, characterized in that the radial width of the annular chamber is about 1.5 times the radial width of the inlet and of the annular space.

* * * * *